United States Patent Office 3,334,127
Patented Aug. 1, 1967

3,334,127
PROCESS FOR PREPARING LACTAMIC SULFATE
Richard Parke Welcher, Old Greenwich, Conn., assignor to American Cyanamid Company, Stamford, Conn., a corporation of Maine
No Drawing. Filed Mar. 6, 1964, Ser. No. 350,075
3 Claims. (Cl. 260—458)

This invention relates to a novel process for the preparation of lactamic sulfate.

Lactamic sulfate, which may also be named as 1-carbamoylethyl hydrogen sulfate, lactamide H sulfate, or $\alpha$-carbamoylethyl hydrogen sulfate, has the formula:

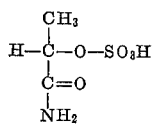

From its structural representation, it may be noted that this compound is an ester of lactamide, obtained from lactonitrile and sulfuric acid.

While the prior art describes many times the reaction of lactonitrile, that is, acetaldehyde cyanohydrin, with sulfuric acid, there seems to have been uncertainty as to the structure of lactamic sulfate. Moreover, the properties and physical characteristics of lactamic sulfate do not appear to have been previously defined, nor has its empirical formula ever been established by ultimate analysis.

For example, J. Verhulst, Bull. Soc. Chem. Belg., 39, 563 (1930), and 40, 475 (1931) outlined the reaction of sulfuric acid with ketone cyanohydrins and aldehyde cyanohydrins and indicated that the products had the general formula: $SO_4H \cdot CRR'(H) \cdot CO \cdot NH_2$. The 1931 article is of interest in connection with the present invention for in that article Verhulst reported the addition of concentrated sulfuric acid to acetaldehyde cyanohydrin and represented the formula of the product as:

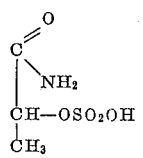

A nitrogen analysis for the neutralized reaction product obtained from acetaldehyde cyanohydrin and sulfuric acid is also included in the article. However, this analysis was not for lactamic sulfate but its sodium salt monohydrate. Verhulst further disclosed that the reaction of sulfuric acid with aldehyde cyanohydrins was conducted in the same manner as with ketone cyanohydrins, that is, presumably, by gradually adding an equimolecular quantity of sulfuric acid to the cyanohydrin and insuring that the temperature was kept below 25° C.

Trusler, U.S. Patent No. 1,581,621, described the production of amide acid sulfates from nitriles and sulfuric acid monohydrate. The amide acid sulfate is described by the patentee as having the formula:

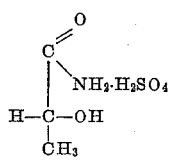

and is named as lactamide acid sulfate, a white crystalline compound. However, from the reaction conditions and Trusler's statements, it would appear that Trusler obtained the sulfuric acid salt of lactamide rather than an ester. It is interesting to note that Verhulst's sodium salt monohydrate of lactamide H sulfate and Trusler's lactamide sulfate, sodium derivative, would have the same nitrogen analysis. Consequently, there would seem to be uncertainty as to the actual compound obtained by Verhulst. It may also be seen that Trusler's process employed equimolecular quantities of water, acetaldehyde cyanohydrin, and sulfuric acid, a temperature of 70° C., and a reaction time of eight hours.

Some clarification of the reaction products of cyanohydrins with sulfuric acid appeared in Crawford, J. Soc. Chem. Ind., 64, 231 (1945). The author there reporting the reaction of acetone cyanohydrin and acetaldehyde cyanohydrin with sulfuric acid referred to Verhulst's studies. Crawford stated that the reaction product of sulfuric acid and acetone cyanohydrin was a viscous fluid, noncrystallizable product. The reaction using an equimolecular or excess quantity of sulfuric acid was said to be quantitative. The viscous fluids so obtained by Crawford were described as useful for conversion to the unsaturated amides. By contrast, when acetaldehyde cyanohydrin was added to sulfuric acid at 80° C., a crystalline solid was obtained which could not be converted to an unsaturated amide. While Crawford did not extensively recite the properties or physical characteristics of this reaction product, he named it as $\alpha$-carbamoylethyl hydrogen sulfate which presumably is the sulfuric acid ester of lactamide, not the salt of lactamide as Trusler had described as having obtained.

With the processes for preparing lactamic sulfate of either Verhulst or Crawford, considerable difficulty is encountered. As has been pointed out, each author employed equivalent quantities of lactonitrile and sulfuric acid and in the case of Crawford, an excess of sulfuric acid was utilized. However, it has been observed that in carrying out their procedures, the mixture of reactants becomes extremely thick during the course of the reaction with the result that stirring becomes ineffective and control of the exotherm frequently impossible. Varying the order of addition, adding the acid to the nitrile, appears to have little influence on improving the overall results of the reaction. Indeed, because of the high viscosity of the reaction mixture and resultant stirring difficulties and frequently uncontrollable exotherm, low yields and impure lactamic sulfate result.

I have now discovered a novel process whereby the yield and purity of lactamic sulfate may be drastically improved thus representing significant processing improvements over the prior art. The process of the present invention involves preparing lactamic sulfate employing a lactonitrile-sulfuric acid molecular ratio of at least 1/1, carrying out the reaction in the presence of excess nitrile, and adding sulfuric acid to lactonitrile. With such process improvement, stirring of the reaction mixture presents no problem and temperature control is easily achieved.

While the excess nitrile is preferably lactonitrile, other substantially inert nitriles may also be employed. Thus, if lactonitrile is employed in excess, ratios of lactonitrile-sulfuric acid of greater than 1/1, for example, even 2/1 and higher are suitable. Preferably, however, the ratio of lactonitrile-sulfuric acid is maintained within the range of from about 1.1/1 to about 1.9/1. While the exact theory underlying the obtaining of lactamic sulfate in good yield and of high purity is not completely understood, it is felt that the excess lactonitrile probably serves as a very effective diluent for the reaction mixture. Substantially inert nitriles which may be used as diluents and as replacements for some of or all of excess lactonitrile include acetonitrile, acrylonitrile, cyanobutadiene, propionitrile, and the like, or mixtures thereof. The use of such diluents seems to allow lower lactonitrile-sulfuric acid ratios, for example, even as low as 1/1, and yet temperature control is not troublesome and side reactions are minimized.

For optimum results, it is preferred to add sulfuric acid to lactonitrile, although a desirable alternative is to simultaneously add both reactants to the reaction vessel as long as excess nitrile is present.

Another essential feature of the present invention is that the temperature is closely controlled within a narrow critical range during the reaction. As mentioned previously, Verhulst employed temperatures below about 25° C. while Crawford employed temperatures of 80° C. or higher. I have found that maintaining the temperature between about 50° C. and 75° C. and preferably between about 60° C. and 70° C. affords optimum yield and purity of product.

Lactamic sulfate when obtained by the procedures of this invention is a crystalline cream-colored solid with a melting point of 160° C. (dec.). It is a strong acid and is an easily handled catalyst for acid catalyzed reactions and is also useful as an intermediate in the manufacture of other chemical compounds.

The lactonitrile reactant may be a substantially pure material, that is, distilled 98% pure, or a crude material, approximately 85% pure, such as that which is found as still-bottoms in the purification of acrylonitrile made from acetylene and hydrogen cyanide. Impurities which may be present in such lactonitrile-rich still-bottoms including acrylonitrile, cyanobutadiene, and higher boiling chlorinated compounds do not appear to adversely affect the yield of lactamic sulfate.

It is advantageous to use sulfuric acid having a concentration of from about 90 to about 120%. More dilute sulfuric acid may tend to produce as a by-product the compound which Trusler describes as lactamide acid sulfate, that is, the sulfuric acid salt of lactamide.

The reaction time is not especially critical. In general, reaction times of from about one-half hour to six hours are satisfactory with reaction times of from about one to two hours being preferred.

After the reaction has been completed, the reaction mixture is cooled and the solid lactamic sulfate is recovered by conventional means. Thus, lactamic sulfate is separated by crystallization, precipitation, or the like followed by filtration, centrifugation, or the like and may be washed with inert solvent such as acetonitrile and subsequently dried.

In order to further illustrate the present invention, the following non-limiting examples are given.

*Example 1*

[Based on a procedure of J. Verhulst employing equimolar quantities of lactonitrile and sulfuric acid and addition of sulfuric acid to lactonitrile so that lactonitrile is present in excess until addition is complete.]

With the temperature kept below 25° C., 52.6 g. (0.50 mole) of 66° Bé. (~92–93%) sulfuric acid is added to 40.8 g. (0.50 mole) of distilled (87%) lactonitrile. The product is a stiff paste which gives a strong test for sulfate ion, contrary to the implication of Verhulst. The paste has a neutralization equivalent of 127, showing much unreacted sulfuric acid. After extensive and repeated washings with acetonitrile and drying, a 9% yield of lactamic sulfate is obtained with a satisfactory infrared spectrum and neutralization equivalent of 167.

*Example 2*

[Based on procedure of J. Crawford, employing excess sulfuric acid and adding lactonitrile to the sulfuric acid so that the latter is always present in excess.]

With the temperature kept at 75°–80° C., 40.8 g. (0.50 mole) of distilled (87%) lactonitrile is added to 76.1 g. (0.75 mole) of 96.6% sulfuric acid. The reaction mixture becomes progressively thicker during the addition, and solidifies after the addition is complete. As stirring is stopped, the exotherm carries the temperature of the reaction mixture to 95° C. To recover the product, it is necessary to break up the contents of the reaction vessel. Two washings of the product with acetonitrile affords lactamic sulfate in 61% yield based on lactonitrile, the limiting reagent. Its neutarilization equivalent is 165 (suggesting complete removal of unreacted acid). The infrared spectrum is satisfactory.

*Example 3*

[Based on alternate procedure of J. Crawford using equimolar quantities of lactonitrile and sulfuric acid and addition of lactonitrile to sulfuric acid.]

With temperature kept at 74°–82° C., 40.8 g. (0.50 mole) of distilled (87%) lactonitrile is added to 50.7 g. (0.50 mole) of 96.6% sulfuric acid. The mixture begins to solidify during the addition, stopping stirring. The temperature of the reaction mixture rises to 86° C. The contents of the reaction vessel are broken up and the product is washed twice with acetonitrile to give 61% yield of lactamic sulfate. Its neutralization equivalent is 164, suggesting incomplete removal of acid by the usual acetonitrile treatment. The infrared spectrum is satisfactory.

*Example 4*

[Based on procedure of J. Crawford, addition of lactonitrile to sulfuric acid but using an overall excess of lactonitrile. Thus, acid is present in excess during initial phase of the addition; later, lactonitrile is present in excess.]

With the temperature kept at 75°–80° C., 61.1 g. (0.75 mole) of distilled (87%) lactonitrile is added to 50.7 g. (0.50 mole) of 96.6% sulfuric acid. A cake of solid forms in the reaction vessel during the addition, interfering with stirring and temperature control. The product is broken up in the vessel and washed twice with acetonitrile to give a 56% yield of lactamic sulfate based on sulfuric acid, the limiting reagent; and a 37% yield based on lactonitrile. The neutralization equivalent of 168 is satisfactory, but the infrared spectrum shows the product to be impure lactamic sulfate.

*Example 5*

To a flask containing 200 g. (2.31 moles) of still-bottoms obtained from an acrylonitrile purification unit and containing 82% lactonitrile is added 152 g. (1.50 moles) of 96.7% sulfuric acid over a period of 1.4 hours. The temperature gradually rises to 70° C. during the addition and the syrup is held at 63–68° C. by intermittent cooling for twenty-five minutes. Solid begins to appear soon after the addition. After another ten minutes, the slurry is cooled to room temperature and at the same time diluted with 150 ml. of acetonitrile. The solid is filtered off and dried at reduced pressure. A second washing with 150 ml. of acetonitrile removes the remaining unreacted lactonitrile. Lactamic sulfate, a cream-colored solid, M.P., 160° C. (dec.) amounting to 215 g. (corresponding to an 85% yield based on sulfuric acid) is obtained having a neutralization equivalent of 171. A sample of lactamic sulfate, prepared as above, is analyzed.

Calculated for $C_3H_7NO_5S$: N, 8.28; S, 18.95. Found: N, 8.60; S, 19.25.

A satisfactory infrared spectrum is obtained showing characteristic bands at 3360, 3100, 1700, 1280, 1170, 1015, 953, and 790 cm.$^{-1}$.

*Example 6*

To a mixture of 28.4 g. (0.39 mole) of distilled 98% lactonitrile and 15.6 g. (0.38 mole) of acetonitrile (reagent grade) is added 38.3 g. (0.38 mole) of 97% sulfuric acid over a period of 0.7 hour at 70–75° C. Near the end of the addition, solid begins to appear. After one hour stirring at ambient temperature, the slurry is cooled to 15° C. and filtered. The solid is triturated with 50 ml. of acetonitrile and refiltered. The solid is dried at constant weight to give 42 g. (65%) of lactamic sulfate. Its infrared spectrum is satisfactory.

From the results of the comparative procedures as described hereinabove, it will be noted that the process of this invention which is exemplified in Examples 5 and 6 is surprisingly effective in affording high yields (85% and 65%, respectively) of substantially pure lactamic sulfate, as indicated by the neutralization equivalent and nitrogen and sulfur analyses which are in good agreement with the theoretical and satisfactory infrared spectra.

In marked contrast, however, are the results of various prior art procedures. Thus, the process of Example 1, employing equimolar quantities of lactonitrile and sulfuric acid and low temperatures, produces an extremely low yield (9%) of lactamic sulfate which contains considerable unreacted sulfuric acid thereby requiring repeated washings of the product. The method of Example 2, employing sulfuric acid in excess, is beset with processing difficulties: solidification of the reaction mixture causing interruption in agitation, uncontrollable exotherm, and troublesome removal of the product from the reaction vessel. The reaction described in Example 3, employing equimolar quantities of lactonitrile and sulfuric acid and high temperatures, produces results like those in Example 2: the reaction mixture solidifies resulting in stoppage of stirring and operational difficulties, and a less pure lactamic sulfate is obtained. Finally, the processing variation of Example 4, in which sulfuric acid in excess is present during the early part of the overall reaction and lactonitrile in excess is present during the latter part, would appear to suggest, contrary to the present discovery, that the use of excess lactonitrile should be avoided: the reaction mixture solidifies and low yield (56%) of impure lactamic sulfate results.

While the present invention has been described in conjunction with several preferred embodiments, it is to be understood that it is not to be expressly limited thereto but is to be construed broadly and restricted solely by the appended claims.

I claim:

1. A process for preparing lactamic sulfate which comprises bringing into reactive contact lactonitrile and sulfuric acid at a temperature between about 50° to 75° C. while maintaining a lactonitrile-sulfuric acid molecular ratio of at least 1/1 and carrying out said contact in the presence of excess nitrile.

2. The process as in claim 1 in which said temperature is between 60° to about 70° C., said molecular ratio is between about 1.1/1 and about 1.9/1, and said reactive contact is established by adding sulfuric acid to lactonitrile.

3. The process as in claim 1 in which said excess nitrile is lactonitrile.

References Cited
UNITED STATES PATENTS

| | | | |
|---|---|---|---|
| 2,425,694 | 8/1947 | Davis et al. | 260—458 |
| 2,431,468 | 11/1947 | Davis et al. | 260—561 |

CHARLES B. PARKER, *Primary Examiner.*

JOSEPH P. BRUST, *Examiner.*

F. D. HIGEL, *Assistant Examiner.*